United States Patent [19]
Kiriazis

[11] Patent Number: 6,080,823
[45] Date of Patent: Jun. 27, 2000

[54] POWDER COATING FOR PACKAGING CONTAINERS

[75] Inventor: Leonidas Kiriazis, Münster, Germany

[73] Assignee: PPG Industries Ohio, Inc., Cleveland, Ohio

[21] Appl. No.: 08/807,413

[22] Filed: Feb. 28, 1997

[30] Foreign Application Priority Data

Mar. 1, 1996 [DE] Germany .......................... 196 07 914

[51] Int. Cl.⁷ .................................................. C08F 20/00
[52] U.S. Cl. .................. 525/438; 525/107; 525/529; 525/533
[58] Field of Search ................................... 525/453, 528, 525/934, 107, 529, 533, 438

[56] References Cited

U.S. PATENT DOCUMENTS

| | | | |
|---|---|---|---|
| 4,670,508 | 6/1987 | Ohdaira et al. | 525/285 |
| 4,734,468 | 3/1988 | Marx | 525/524 |
| 5,214,101 | 5/1993 | Pettit, Jr. et al. | 525/934 |
| 5,453,295 | 9/1995 | Sammel et al. | 525/934 |
| 5,498,663 | 3/1996 | Shimada et al. | 525/523 |
| 5,605,985 | 2/1997 | Rademacher et al. | 525/934 |

FOREIGN PATENT DOCUMENTS

| | | |
|---|---|---|
| 833084 | 4/1976 | Belgium . |
| 2008710 | 2/1970 | Germany . |
| 4038681 | 6/1992 | Germany . |

*Primary Examiner*—Robert Dawson
*Assistant Examiner*—D. Aylward
*Attorney, Agent, or Firm*—Paul S. Chirgott

[57] ABSTRACT

The present invention relates to a powder coating for application to packaging containers, 1) the powder coating comprising
   A) at least one thermoplastic,
   B) if desired, at least one thermoset, preferably an epoxy resin having an epoxy equivalent weight of from 400 to 3000,
   C) if desired, pigments, fillers, catalysts, typical powder coating additives such as degassing agents, levelling agents, free-radical scavengers and antioxidants, and
2) the powder coating having a particle-size distribution such that
   a) at least 90 percent by mass of the powder-coating particles have a size of between 1 and 120 $\mu$m,
   b) the maximum size of the powder-coating particles is $\leq$150 $\mu$m for at least 99 percent by mass of the particles, and
   c) the mean size of the powder-coating particles in between 1 and 60 $\mu$m, preferably from 1 to 30 $\mu$m.

12 Claims, No Drawings

POWDER COATING FOR PACKAGING CONTAINERS

The present invention relates to a powder coating which is particularly suitable as a coating for packaging containers.

Liquid coating materials are nowadays preferably used for the coating of packaging containers. These materials give rise to numerous environmental problems as a result of their solvent content. This also applies to cases where aqueous coating materials are employed.

It is therefore increasingly being attempted to replace these coating materials by low-solvent or solvent-free substitutes. For example, thermoplastic powder coatings have already been used frequently for the covering of can weld seams. These products are prepared by expensive cold milling from the corresponding thermoplastics.

Furthermore, EP-B 119 164 discloses thermosetting powder coatings for the weld-seam covering of metal containers which are used to hold foods or beverages. The binder in these thermosetting powder coatings is a mixture of an aromatic epoxy resin having on average not more than 2 epoxide groups per molecule and of an aromatic epoxy resin having on average more than 2 epoxide groups per molecule. The hardener used is the condensation product of bisphenol A diglycidyl ether with bisphenol A, and/or an acidic polyester based on trimellitic anhydride/aliphatic polyol. In EP-B-119 164, however, there are no indications regarding appropriate particle size and particle-size distributions of the powder coatings. A further disadvantage is that these powder coatings are suitable only for weld-seam covering.

EP-B-10 805 discloses powder coatings for the interior coating of cans, containing a polyester having terminal carboxyl groups and an OH number of less than 10 mg of KOH/g, and an epoxy resin. As curing catalyst these powder coatings contain choline derivatives. The powder coatings have a mean particle size of between 20 and 150 $\mu$m. However, EP-B-10 805 contains no information on how can interior coatings can be obtained that give coherent films even at coat thicknesses $\leq$15 $\mu$m. Moreover, as a result of the low OH number of the polyester, these powder coatings have the disadvantage of only poor crosslinking. Correspondingly, this system shown drying times which are unacceptable in practice, raging from 10 to 40 minutes at from 150 to 220° C., whereas the drying time in modern production plants is at maximum 20 to 30 s at an article temperature of from 260 to 280° C.

U.S. Pat. No. 4,497,837 discloses powder coatings for the interior coating of cans and can lids, containing an epoxy resin and aromatic amines, Lewis acids or acid anhydrides as hardeners. The powder coatings have a mean particle size of between 20 and 150 $\mu$m, preferably from 30 to 70 $\mu$m. A disadvantage with these systems is the high minimum coat thickness of 38 $\mu$m in order to achieve coatings without excessive porosity. Furthermore, these powder coatings have the disadvantage that oven residence times of between 5 and 12 minutes are necessary in order to cure the systems described.

Furthermore, U.S. Pat. No. 3,962,486 discloses powder coatings for the interior coating of cans that likewise include an epoxy resin and aromatic amines, epoxy-amine adducts or acid anhydrides. By using the plasma spray coating technique it is possible to produce coatings which meet the usual requirements placed on interior coatings of food packaging even at low coat thicknesses of less than 13 $\mu$m. To ensure the ability for application by the plasma spray technique, the only powder coatings which it is permitted to use are those having a maximum particle size $\leq$100 $\mu$m and a sufficiently low melt viscosity.

The use of amine hardeners, however, leads to inadequate sterilization resistance in the resulting coatings. Further disadvantages are that epoxy resins cured with amines tend toward embrittlement and have very poor elasticities. Acid anhydride hardeners have the disadvantage that they are highly irritant, with the result that particular precautionary measures are necessary when formulating the powder coatings.

Finally, U.S. Pat. No. 4,183,974 discloses powder coatings for the interior coating of cans, containing an epoxy resin and an amine hardener. These powder coatings have mean particle sizes of between 1 and 100 $\mu$m, preferably between 1 and 10 $\mu$m. The resulting coatings do indeed have the required low porosity even at coat thicknesses of $\leq$13 $\mu$m; however, the resulting coatings are in need of improvement. Further disadvantages are that epoxy resins cured with amines tend toward embrittlement and have very poor elasticities.

Coatings produced from powder coating materials for preserve cans, moreover, are also known from German Patent Applications P 40 38 681.3 and P 42 04 266.6.

The results with powder coatings have overall not been satisfactory to date; in particular, increased coat thicknesses are required in order to obtain a uniform appearance. Furthermore, when so-called double cans which are produced for preserve cans are broken open, the broken edges of the coating material are unsatisfactory.

The object of the present invention, therefore, is to provide a powder coating for the interior coating of packaging containers, especially preserve cans, which no longer has the disadvantages set out in the introduction.

The object is achieved in that
1) the powder coating comprises
   A) at least one thermoplastic,
   B) if desired, at least one thermoset, preferably an epoxy resin having an epoxy equivalent weight of from 400 to 3000,
   C) if desired, pigments, fillers, catalysts, typical powder coating additives such as degassing agents, levelling agents, free-radical scavengers and anti-oxidants, and
2) the powder coating has a particle-size distribution such that
   a) at least 90 percent by mass of the powder-coating particles have a size of between 1 and 120 $\mu$m,
   b) the maximum particle size of the powder-coating particles is $\leq$150 $\mu$m for at least 99 percent by mass of the particles, and
   c) the mean size of the powder-coating particles is between 1 and 60 $\mu$m, preferably 1 and 30 $\mu$m.

The proportion of component A) in accordance with the invention is from 60 to 90, preferably from 70 to 80% by weight, that of component B) from 0 to 20, preferably from 10 to 15% by weight, and that of component C) from 10 to 20, preferably from 10 to 15% by weight.

The invention also relates to a process for the interior coating of packaging containers in the case of which these powder coatings are applied.

Finally, the invention also provides for the use of the powder coatings for the interior coating of packaging containers.

It is surprising and was not foreseeable that particle sizes in the range <30 $\mu$m can be achieved with the abovementioned thermoplastic powder coatings by using the abovementioned mixture with thermosets, and that the set of properties and therefore the intended use of powder coatings can be controlled in a targeted manner by establishing a specific particle-size distribution. At the same time, the novel powder coatings can be cured rapidly, are easy to handle and are simple to apply.

The novel powder coatings are additionally notable for the fact that coatings having only a very low coat thickness of ≦15 μm have the properties desired for interior coatings by the can manufacturers. In particular, these coatings have the required low porosity even at a low coat thickness of ≦15 μm. These coatings are additionally notable for good adhesion, high flexibility and good pasteurization and sterilization resistance.

Thermoplastics which can be used in accordance with the invention are polymers, copolymers, terpolymers, graft polymers and ionomers. Examples which may be mentioned are polyurethanes, polyamides, polyethylenes and polyesters.

In accordance with the invention it is possible in particular to employ polyurethane-based plastics containing one or more polyester diols having a molecular weight from 600 to 1200, preferably from 800 to 1000. Particularly suitable polyester diols are polybutanediol adipates, polyethylene glycol or mixtures thereof.

To prepare the thermoplastic polyurethanes the structural components are reacted in appropriate amounts in the presence, if desired, of catalysts, auxiliaries and/or additives.

Suitable catalysts, which in particular accelerate the reaction between the NCO groups of the diisocyanates and the hydroxyl groups of the structural components, are the tertiary amines which are customary and known in the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like, and, in particular, organometallic compounds, such as titanium acid esters, iron compounds, for example iron(III) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. The catalysts are commonly employed in amounts of from 0.002 to 0.1 part per 100 parts of polyhydroxy compound.

In addition to catalysts, auxiliaries and/or additives can also be incorporated into the thermoplastics (A). Mention may be made, for example, of lubricants, inhibitors, stabilizers against hydrolysis, light, heat or discoloration, dyes, pigments, anti-oxidants and/or free radical scavengers, reinforcing agents and plasticizers.

Further details about the abovementioned auxiliaries and additives are given in the technical literature, for example in the monograph by J. H. Saunders and K. C. Frisch "High Polymers", Volume XVI, Polyurethanes, Part 1 and 2, Verlag Interscience Publishers 1962 and 1996, from the abovementioned Kunststoff-Handbuch, Volume VII, Polyurethanes or from DE-A-29 01 774.

It is preferred to employ thermoplastic polyurethanes having a Shore A hardness of from 70 to 95 and those having a Shore D hardness of from 54 to 80 which are prepared by reacting polyoxytetramethylene glycol or alkanediol polyadipates having 2 to 6 carbon atoms in the alkylene radical, linear aliphatic and/or cycloaliphatic diisocyanates, for example hexamethylene 1,6-diisocyanate or 4,4'-dicyclohexylmethane diisocyanate, and/or aromatic diisocyanates, for example 4,4'-diphenylmethane diisocyanate and 1,4-butanediol in a ratio of equivalents of NCO:OH groups of from 1:0.95 to 1:0.5.

In accordance with the invention, particular preference is given to polyethylene compounds which can be obtained, for example, under the designation Lupolen® (obtainable from BASF AG). Polyethylenes of this kind can be prepared by free-radical polymerization of ethylene at high pressures (from 1500 to 3000 bar) or by coordinative polymerization with the aid of catalysts at low pressures. Depending on the polymerization conditions, the polymers formed are variable in density (from 0.90 to 0.97 g/cm$^3$) and in molar mass. Polyethylenes are normally characterized by means of densities and melt indices. By polymerizing ethylene with polar monomers such as vinyl acetate, acrylates, acrylic acid or apolar α-olefins such as 1-butene, 1-hexene, etc., it is possible to obtain copolymers with specific changes in polymer structure. Preference is given in accordance with the invention to those polyethylenes formed by low-pressure polymerization, such as, for example, the above-cited Lupolen.

The polyethylenes are partially crystalline plastics. Depending on the polymerization conditions, polyethylenes with a variable degree of branching are produced. The less branched the macromolecules, the higher the crystalline fraction and therefore the density as well. The level of the crystalline fraction and the cryetallite thicknesses determine the melting properties, i.e. the melting point and the heat of fusion of the polyethylenes. The mechanical properties depend directly on the crystallinity and density and on the molar mass. Rigidity and hardness increase as the density rises. In the case of the copolymers, rigidity and hardness decrease as the comonomer content grows, an a result of falling crystallinity. Consequently, in accordance with the invention the degrees of branching and the crystalline fraction are to be controlled such that the preferred hardness ranges are reached.

The copolymers, terpolymers, graft copolymers and ionomers that can be employed in accordance with the invention can be used under the proviso that they have carboxyl or anhydride groups, or groups which can be hydrolyzed to carboxyl groups, and that the melt index of the polymers, measured at 190° C. under a load of 2.16 kg, is between 0.1 and 30 g/10 min, preferably between 0.2 and 25 g/10 min and, with particular preference, between 0.5 and 20 g/10 min.

Suitable co- and terpolymers can be prepared by copolymerizing ethylene and α,β-unsaturated carboxylic acids such as acrylic acid, methacrylic acid, itaconic acid, crotonic acid, isocrotonic acid, maleic acid and fumaric acid, the corresponding anhydrides or the corresponding esters or monoesters having 1 to 8 carbon atoms in the alcohol residue, such as methyl, ethyl, propyl, butyl, pentyl, hexyl, cyclohexyl, heptyl, octyl and 2-ethylhexyl esters of the acids listed. It is likewise possible to employ the corresponding salts of the carboxylic acids listed an well, for instance the sodium, potassium, lithium, magnesium, calcium, zinc and ammonium salts. Preference is given to employing the carboxylic acids and their anhydrides.

In the course of the copolymerization it is also possible to employ further monomers which can be copolymerized with ethylene and the unsaturated carbonyl compounds. Suitable examples are α-olefins having 3 to 10 carbon atoms, vinyl acetate and vinyl propionate.

In this context, the amounts of the monomers employed are chosen such that the corresponding polymer has a carboxyl group content of from 0.1 to 30% by weight, preferably from 2 to 20% by weight, and that the content of ethylene units in the polymer is up to 99.9% by weight, preferably between 75 and 95% by weight.

Suitable graft copolymers can be prepared by grafting at least one polymer from the group of the polyolefins with up to 10% by weight, preferably up to 5% by weight, based on the overall weight of the monomers, of at least one monomer from the group of the α,β-unsaturated carboxylic acids, their anhydrides, their esters or salts, in the presence or absence of peroxides.

The ionomers employed can be prepared by the copolymerization, already described above, of ethylene and, if desired, other monomers with salts of α,β-unsaturated carboxylic acids or by partial neutralization of the carboxylic acid-containing copolymers, terpolymers and graft polymers, already described above, with salts, oxides and hydroxides of sodium, potassium, lithium, magnesium, calcium, zinc and ammonium. Neutralization can be carried out in the melt or in the solution. In this context, the amount of basic compound is chosen such that the degree of neutralization of the polymer is between 0.1 and 99%, preferably between 0.1 and 75% and, with very particular preference, between 0.1 and 40%.

The thermosets (B) that are employed in the novel powder coatings are preferably epoxy resins, in particular in combination with polyethylenes or polyesters. They are in particular solid epoxy resins having an epoxide equivalent weight of from 400 to 3000, preferably from 600 to 8000, particularly preferably 700 to 800. Aromatic, aliphatic and/or cycloaliphatic epoxy resins are suitable. Preference is given to the use of aromatic epoxy resins based on bisphenol A and/or bisphenol F and/or epoxy resins of the novolak type. Particularly preferred epoxy resins employed based on bisphenol A or bisphenol F have an epoxide equivalent weight of from 500 to 2000. Particularly preferred epoxy resins employed of the novolak type have an epoxide equivalent weight of from 500 to 1000. In this context, epoxy resins based on bisphenol A and/or bisphenol F generally have a functionality of not more than 2, and epoxy resins of the novolak type a functionality of in general at least 2. However, the epoxy resins based on bisphenol A and/or bisphenol F may also be brought to a functionality of more than 2 as a result of branching, for example by means of trimethylolpropane, glycerol, pentaerythritol or other branching reagents.

It is of course also possible to employ other epoxy resins, for example alkylene glycol diglycidyl ethers or their branched follow-on products, or epoxy resins based on bisphenol A or F, or the like, that are flexibilized with alkylene glycols. Also suitable, furthermore, are mixtures of various of the epoxy resins mentioned.

Examples of suitable epoxy resins are the products obtainable commercially under the following name: Epikote® 154, 1001, 1002, 1055, 1004, 100.7, 1009, 30034F-10 from Shell-Chemie, XZ 86 795 and DER® 664, 667, 669, 662, 642U and 672U from Dow, and Araldit®, GT 6064, GT 7072, GT 7023, GT 7004, GT 7304, GT 7097 and GT 7220 from Ciba Geigy.

In the thermoset components (B) of the powder coatings it is possible for hardener components to be present, or to be added thereto. They are normally employed in an amount of from 10 to 50% by weight, preferably from 15 to 40% by weight, based in each came on the overall weight of component (B).

Compounds suitable as hardener component are all solids having more than one phenolic OR group, preferably from 1.8 to 4 and, with particular preference, ≦3 phenolic OH groups per molecule, and having a hydroxyl-equivalent weight, based on OH groups, of from 100 to 500, preferably from 200 to 300.

Hardeners preferably used are those based on bisphenol A and/or bisphenol F. A particularly preferred hardener is the condensation product of the diglycidyl ether of bisphenol A or bisphenol F with bisphenol A or bisphenol F, respectively, in particular the condensation product having an equivalent weight, based on phenolic hydroxyl groups, of from 220 to 280. These condensation products are usually prepared by reacting generally excess bisphenol with a bisphenol diglycidyl ether in the presence of an appropriate catalyst. The condensation product is preferably prepared by reacting the diglycidyl ether with the bisphenol in a weight ratio of from 0.5 to 2. These hardeners on the basis of these condensation products of the bisphenol diglycidyl ether with a bisphenol generally have a functionality of not more than 2, it being possible in turn to establish higher functionalities by using branching reagents.

Furthermore, other suitable hardeners are the reaction products of bisphenols with epoxy resins of the novolak type. These hardeners are preferably obtained by reacting the epoxy resin with the bisphenol in a weight ratio of from 0.5 to 2 in the presence of an appropriate catalyst.

Suitable examples are the phenolic hardeners described in DE-C-23 12 409 in column 5, line 2 to column 6, line 55.

Furthermore, it is also possible to employ the phenolic hardeners described in DE-A-30 27 140.

Flexibilized hardeners and/or hardeners modified with branching reagents are of course also suitable. In addition, it is possible as well to use mixtures of various hardeners of those mentioned above. Among these, preference is given to the use of FDA-approved hardeners.

Examples of such commercially available, hydroxyl-containing hardeners which are preferably employed are the products obtainable commercially under the following names: Härter XB 3082 from Ciba Geigy and Epikure® 169 and 171 from Shell-Chemie.

As a further component the novel powder coatings can include at least one curing catalyst, normally in an amount of from 0.01 to 5.0% by weight, preferably from 0.05 to 2.0% by weight, based in each case on the overall weight of the powder coating.

The catalyst is advantageously imidazole, 2-methylimidazole, ethyltriphenylphosphonium chloride or another salt thereof, a quinoline derivative as described, for example, in EP-B-10 805, a primary, secondary or tertiary aminophenol, aluminum acetylacetonate or a toluene-sulfonic acid salt, or a mixture of various of the abovementioned catalysts.

The commercially obtainable hydroxyl-containing hardeners normally already contain a curing catalyst.

Furthermore, the thermoset powder coatings according to component (B) may, if desired, include auxiliaries and additives. Examples of these are the substances listed for component (A).

In addition, the novel powder coatings with the components (A) and (B) may also comprise from 0 to 55% by weight, preferably from 15 to 25% by weight, of fillers. FDA-approved fillers are preferably employed. Inorganic fillers are generally employed, for example titanium dioxide, such as Kronos 2160 from Kronos Titan, Rutil R 902 from Du Pont and RC 566 from Sachtleben, barium sulfate and silicate-based fillers, for example talc, kaolin, magnesium aluminum silicates, mica and the like. Preference is given to titanium dioxide and fillers of the quartz sand type.

The novel powder coatings with the components (A) and, if desired, (C) may, if desired, additionally contain from 0.01 to 10% by weight, preferably from 0.1 to 2% by weight, based on the overall weight of the powder coating, of further auxiliaries and additives. Examples of these are levelling agents, flow aids, deaerating agents, for example benzoin, pigments, or the like.

Powder coatings particularly suitable for use as an interior coating of packaging containers are those with the components (A), optionally (B) and optionally (C), having both only a small proportion of very fine particles (particle size <5 μm) and also, at the same time, only a very small proportion of coarse powder-coating particles (particle size a ≧25 μm), i.e. those having a particle-size distribution which is as narrow as possible.

For use for the interior coating of packaging containers, the particle-size distribution is generally established so that at least 90 percent by mass of the powder-coating particles have a size between 1 and 120 μm. Preferably, 90 percent by mass of the powder-coating particles have a size between 1 and 40 μm and, with particular preference, between 5 and 25 μm. The maximum size of the powder-coating particles is ≦150 μm for at least 99 percent by mass of the particles, preferably ≦60 μm and, with particular preference, <40 μm. The mean size of the powder-coating particles is between 1 and 30 μm, particularly preferably between 2 and 12 μm. The coatings themselves have the required low porosity at a low coat thickness of ≦15 μm. Furthermore, these coatings are notable for good adhesion, high flexibility and good pasteurization and sterilization resistance.

In addition, it is essential to the invention that, when the powder coatings are used for the interior coating of the packaging containers, the particle-size distribution is adjusted such that the slope S of the particle distribution curve at the point of inflexion is ≧100, preferably ≧150 and, with particular preference, ≧200. To obtain coatings having particularly good properties, it in very particularly preferred to employ powder coatings where the slope S of the particle-size distribution curve at the point of inflexion is ≧300. However, the production costs of the powder coatings increase greatly as the slope increases.

Here, the slope S is defined as the limit value for $f(x_2)-f(x_1)$ toward zero of $(f(x_2)-f(x_1))/1 g ((x_2/x_1))$ at the point of inflexion of the particle distribution curve. This particle distribution curve represents the plot of the cumulative percentages by mass (f(x)) against the absolute particle diameter (x), the particle diameter being represented on the logarithmic scale and the cumulative percentages by mass on the linear scale. For use as an interior coating of packaging containers, therefore, particularly suitable powder coatings are those having both only a relatively small proportion of very fine particles (size <5 μm) and, at the same time, only a very small proportion of coarse powder-coating particles (particle size >25 μm), i.e. having a particle-size distribution which is as narrow as possible.

For the use as a weld-seam cover the particle size distribution (b) is adjusted so that at least 90 percent by mass of the powder-coating particles have a size of between 1 and 100 μm. Preference is given to the use of powder coatings for which at least 90 percent by mass of the powder-coating particles have a size of between 5 and 100 μm. The maximum size of the powder-coating particles is ≦150 μm for at least 99 percent by mass of the particles, preferably ≦100 μm. The mean size (c) of the powder-coating particles is preferably between >20 and 60 μm, particularly preferably between 25 and 40 μm. For use for weld-seam covering, therefore, the powder coatings employed for the interior coating of the packaging containers are also suitable in principle. However, for use for weld-seam covering it is preferred to employ powder coatings containing a higher proportion of coarse powder-coating particles.

Finally, the present invention also relates to a process for preparing the described powder coatings for the coating of packaging containers.

The preparation of the solid powder coatings with the components (A) and, if used, (B) and also, if used, (C) is carried out by known methods (cf. e.g. product information from BASF Lacke+Farben AG, "Pulverlacke" [powder coatings], 1990) by homogenizing and dispersing, for example by means of an extruder, screw compounder, and the like. Following the preparation of the powder coatings, they are prepared for dispersion by milling and, if desired, by classifying and sieving. The spray-drying techniques also come into consideration.

For the preparation of the thermoplastics a polyester or a polyurethane or a polyethylene is milled so that at least 90 percent by mass of the powder-coating particles have a size of between 1 and 120 μm, the maximum size of the powder-coating particles is ≦150 μm for at least 99 percent by mass of the particles, and the mean size of the powder-coating particles is between 1 and 34 μm. Particular preference is given to particle sizes where at least 90 percent by mass of the powder-coating particles have a size of between 1 and 40 μm, the maximum size of the powder-coating particles is ≦60 μm for at least 99 percent by mass of the particles, and the mean size of the powder-coating particles is between 2 and 12 μm. Very particular preference is given to particle sizes where at least 90 percent by mass of the powder-coating particles have a size of between 5 and 25 μm, the maximum size of the powder-coating particles is ≦40 μm for at least 99 percent by mass of the particles, and the mean size of the powder-coating particles is between 2 and 12 μm.

The thermosets are prepared in the same way. In accordance with the invention, they can be milled together with the thermoplastics or separately.

Milling is followed, in accordance with the invention, by the addition if desired of pigments, fillers, catalysts, typical powder coating additives such as degassing agents, levelling agents, free-radical scavengers and antioxidants. This is preferably done in amounts of from 15 to 10% by weight.

The packaging containers which are coated with the novel powder coatings can consist of a very wide variety of materials, can have a very wide variety of sizes and shapes, and can have been prepared by various methods. In particular, however, the novel powder coating dispersions are used to coat metallic containers. These metal containers can have been prepared by first of all rolling sheet metal and then joining it by folding back the edge. The endpieces can then be fastened to the resulting cylinder. The novel powder coatings are employed both for covering the weld seam and for the interior coatings of the can bodies, which in general already have a base. Furthermore, deep-drawn metal containers can also be coated internally with the novel powder coatings. The powder coatings are, however, of course also suitable for the coating of can lids and can bases.

The packaging containers can consist of a wide variety of materials, for example aluminum, black plate, tinplate and various ferrous alloys, which may have been given a passivating layer based on compounds of nickel, of chromium and of tin. Containers of this kind are commonly used as containers for foods and beverages, for instance for beer, juices, fizzy drinks, soups, vegetables, meat dishes, fish dishes, and also, for example, for animal food.

Application takes place in accordance with known methods as are described, for example, in U.S. Pat. No. 4,183,974. In this context, the powder-coating particles are electrostatically charged by friction (triboelectricity). The powder-coating particles are applied with the aid of special spray heads which are known to the skilled worker.

For the interior coating of the packaging containers, the powder coatings are usually applied in a coat thickness ≦15 μm, preferably from 10 to 14 μm. Even at these low coat thicknesses, the coatings meet the requirements commonly placed on such films. The powder coatings can of course also be applied at higher coat thicknesses. For the covering of weld seams, the powder coatings are usually applied in a coat thickness of ≦200 μm, preferably ≦80 μm.

The packaging container whose weld seam or interior has been provided with the novel powder coating is subsequently subjected to a heat treatment in order to cure the powder coating. This heat treatment can be carried out in a variety of ways. In practice, the containers are often conveyed through a through-type oven for this purpose. In such an oven the powder coatings are generally cured fully at container temperatures between 180–240° C. within a period of 5–15 s. In this case it is possible for the through-type oven to be operated at constant temperature or to have a temperature profile which is set in accordance with the prevailing circumstances.

In the case of use for weld seam covering, the novel coatings have a high flexibility, so that the weld seam covering is able to follow deformations of the packaging container in the course of further processing without becoming detached or cracking. Further advantages are that good sterilization resistance is achieved and, in the case of use for double cans, the broken edges of the coating material can be adjusted in a targeted manner.

In accordance with the invention, the powder-coating layer can additionally be coated with a plastics film, preferably with a polypropylene top layer.

The polypropylenes used are random polypropylene copolymers, in each case in the form of a film. These may be composite films which are obtained, for example, by coextrunsion of different random polypropylene copolymers. Polypropylene films of this kind are produced by known methods (blow molding, chill-roll techniques, etc.) from granules of the polypropylenes.

In accordance with the invention, random polypropylene copolymers suitable for preparing the polypropylene films of the polypropylene film/adhesion promoter/metal composites are those obtained by random copolymerization of from 90 to 99% by weight, preferably from 93 to 99% by weight, of propylene and from 1 to 10% by weight, preferably from 1 to 7% by weight, based in each case on the overall monomer weight, of comonomers. The random copolymers have a molar mass distribution $M_w:M_n$ in the range from 2 to 10, preferably 3 to 6, and a melt index MFI 230° C./2.16 kg in the range from 1 to 20 g/10 min, preferably in the range from 4 to 15 g/10 min (measured in accordance with DIN 53 735). Polypropylenes of this kind and methods for their preparation are known. They can be prepared, for example, by the polymerization technique described in DE-A-37 30 022, using a Ziegler-Natta catalyst system. The propylene copolymers can be prepared, for example, in a gas-phase polymerization process at temperatures from 20 to 160° C. and at a pressure of from 1 to 100 bar. The molecular weights of the polymers can be regulated by generally known measures, for example using regulators such as, for example, hydrogen.

Examples of suitable comonomers are $C_2$- and $C_4$- to $C_{12}$-α-monoolefins, especially $C_2$- and $C_4$- to $C_6$-α-monoolefins, such as ethane, 1-butene, 4-methyl-1-pentene, 1-hexene, n-1-octene, n-1-decene and n-1-dodecene.

Random polypropylene copolymers which are particularly suitable for mentioning in this context are those comprising from 1 to 4% by weight of ethylene and from 99 to 96% by weight of propylene, based in each case on the overall weight of the monomer composition, the random copolymers having a molar mass distribution $M_w:M_n$ in the range from 3 to 6 and a melt index MFI 230° C./2.16 kg in the range from 5 to 9 g/10 min (measured in accordance with DIN 53 735). These polypropylene copolymers have a melting range of from about 135 to 155° C. (determined by DSC). When plastics films based on such polypropylenes are used, plastics film/metal laminates are obtained which show no white fracture.

Particular preference is given, furthermore, to random polypropylene copolymers comprising from 90 to 97% by weight propylene, from 2 to 5% by weight of ethylene and 1 to 6% by weight of 1-butene, based in each case on the overall weight of the monomers, and having a molar mass distribution $M_w:M_n$ in the range from 3 to 6 and a melt index MFI 230° C./2.16 kg in the range from 4 to 8 g/10 min. Such random polypropylene copolymers have a melting range from 120° C. to 140° C. (determined by DSC). The plastics films which are obtainable from these polypropylene lead to plastics film/metal laminates which likewise show no tendency whatsoever toward white fracture.

All stated values for the melt index MFI relate to the measurement in accordance with DIN 53735.

The polypropylene copolymers used to produce the novel plastic/metal composites are obtainable, for example, under the trade name Novolen® 3225 MCX and Novolen® 3520 LX from BASF AG.

It is of course also possible to coextrude mixtures of the abovementioned polypropylene copolymers, preferably 1:1 mixtures, to form a film.

In accordance with the present invention the random polypropylene copolymer used to prepare the polypropylene film can be replaced in a proportion of up to 50% by weight by polypropylene homopolymer. In this case, therefore, a mixture of random polypropylene copolymer and of polypropylene homopolymer is extruded to form a polypropylene film. If more than 50% by weight of polypropylene homopolymer is used in the plastics mixture, the metal/plastics laminates produced therefrom show a certain tendency toward white fracture. Suitable propylene homopolymers have a molar mass distribution $M_w:M_n$ in the range from 2 to 10, a melt index MFI 230° C./2.16 kg in the range of from 1 to 20 g/10 min (measured in accordance with DIN 53 735) and an isotactic index in the range from 80 to 99%, preferably from 90 to 98%.

Preference is given to employing a mixture of the random polypropylene copolymer described and of a polypropylene homopolymer having a molar mass distribution $M_w:M_n$ in the range from 3 to 6 and a melt index MFI 230° C./2.16 kg in the range from 4 to 15 g/10 min (measured in accordance with DIN 53 735). The isotactic index of these polypropylene homopolymer is in the range from 80 to 99%, preferably in the range from 90 to 98%. The homopolymers are known and can be prepared, for example, by the polymerization process described in DE-A-3730022.

Particularly preferred propylene homopolymer are those having a molar mass distribution $M_w:M_n$ in the range from 3 to 5 and a melt index MFI 230° C./2.16 kg in the range from 10 to 12 g/10 min (DIN 53 735).

Suitable propylene homopolymers are obtainable, for example, under the trade name Novolen® 1100 N and Novolan® 1125 N (BASF AG).

The thermoplastic polypropylene plastics films described can also contain customary additives, for example internal and external lubricants, antiblocking agents, stabilizers, antioxidants, pigments, crystallization auxiliaries and the like. These additives are employed in the amounts necessary for preparation, processing, finishing and use, in the form of coarse or fine powders or beads or are incorporated directly in the polymer. Further details regarding the commonly used amounts and examples of suitable additives can be found, for example, in the book Gächter-Müller, Kunstutoff-additive [Plastics additives], Carl-Hanser Verlag.

It is particularly advantageous if the thermoplastic polypropylene films contain up to 0.5% by weight, based on the overall weight of the film, of erucamide and/or oleamide as lubricants and up to 0.2% by weight, based on the overall weight of the plastics film, of antiblocking agent, preferably silica, and also, if desired, antioxidants and, if desired, further processing stabilizers.

Antioxidants used are preferably phenol derivatives. Further suitable additives are titanium dioxide, calcium carbonate, diatomaceous earth, calcium stearate, and primary and secondary fatty acid amides. UV stabilizers employed, for example, are UV stabilizers of the HALS type.

The layer of adhesion promoter arranged between the polypropylene support film and the metal can likewise contain the abovementioned additives. Preferably, however, they are incorporated into the polypropylene support film.

The production of the plastics film/adhesion promoter/metal composites is a generally known process. The procedure for it is first of all to coextrude the thermoplastic for the support film, and the adhesion promoter, together. The metal sheet in then covered with the prepared coex film in such a way that the layer of adhesion promoter in the composite contacts the metal surface. Through the application of pressure and heat, the polypropylene film/adhesion promoter/metal composite is prepared either by means of a heatable press or in the roll nip of a roller assembly or calendar by means of heatable rollers. The pressure and the temperature here are to be chosen such that, on the one hand, the adhesion promoter enters into a solid and stable bond with the metal film and/or the metal sheet, and, on the other hand, the thermoplastic layer does not melt.

The coating of the metal sheet, and/or the thermoplastic composite film, generally has an overall dry-film thickness of less than 500 $\mu$m, preferably from 10 to 200 $\mu$m and, with particular preference, of leas than 100 $\mu$m. The thickness of the adhesion-promoter layer is between 0.5 and 100 $\mu$m. Correspondingly, the thickness of the polypropylene film layer works out at values between 10 and 499.5 $\mu$m. As already mentioned, it is possible to employ thermoplastic composite films consisting solely of an adhesion promoter layer and a top layer, although composite films comprising a plurality of layers can also be employed. In this case, the various thermoplastic layers can each consist of identical or else different materials in an identical or different layer thickness.

In conclusion it should also be mentioned that it is also possible to give the sheet metal, on the side facing the contents, a coating as well, with a preferably planar, thermoplastic composite film or else with a liquid or pulverulent coating material.

The polypropylene top layer/adhesion promoter/metal composites produced in the manner described are employed for the production of packaging containers, and in particular for the production of bases and/or lids of cans, valve plates of aerosol cans, and closures. The preparation of the closure components is carried out by the customary methods (cf., for example, VR-INTERPACK 1969, pages 600–606: W. Panknin, A. Breuer, M. Sodeik, "Abstreckziehen als Verfahren zuw Herstellen von Dosen aus Weißblech" [Drawing and wall ironing as a method of producing tinplate cans], SHEET METAL INDUSTRIES, August 1976: W. Panknin, C H. Schneider, M. Sodeik, "Plastic Deformation of Tinplate in Can Manufacturing"; Verpackungs-Rundechau, Issue 4/1971, pages 450–458: M. Sodeik, I. Siewert, "Die nahtlose Dose aus Weißblech" [The seamless tinplate can]; Verpackungs-Rundechau, Issue 11/1975, pages 1402–1407: M. Sodeik, K. Haaβ, I. Siewert, "Heratellen von Dosen aus Weißblech durch Tiefzishen" [Manufacture of tinplate cans by deep drawing], Arbeitsmappe für den Verpackungepraktiker, Metalle, Teil II, Gruppe 2, Weißblech, Ser. No. 220.042 to 220.048 in neue Verpackung 12/1987, page B 244 to B 246 and neue Verpackung 1/1988, pages B 247 to B 250).

For further details, therefore, refer to the literature.

The novel propylene film/adhesion promoter/metal composites show practically no more white fracture; moreover, the bonds between the metal and the adhesion promoter on the one hand and between the polypropylene film and the adhesion promoter on the other hand are extremely good. The polypropylene top layers protect the metal very well against the attack of the contents, and effects on the contents as a result of corrosion products of the metal are likewise prevented. Impairment to the contents by constituents which have leached out of the polypropylene top layer film has not been found during sterilization and storage of the packaged goods.

I claim:

1. A powder coating for the coating of metal can containers, wherein
   1) the powder coating comprises:
      a) from 65 to 80% by weight, based on the overall weight of the powder coating, of a thermoplastic component, wherein the thermoplastic component comprises at least one thermoplastic material,
      b) optionally, less than 20% by weight, based on the overall weight of the powder coating, of at least one thermoset resin, and
      c) optionally, less than 15% by weight, based on the overall weight of the powder coating, of at least one compound selected from the group consisting of pigments, fillers, catalysts, degassing agents, leveling agents, free-radical scavengers, antioxidants, and mixture thereof, and
   2) the powder coating has a particle-size distribution such that:
      a) at least 90 percent by mass of the powder-coating particles have a size of between 1 and 120 $\mu$m,
      b) the maximum size of the powder-coating particles is $\leq$150 $\mu$m for at least 99 percent by mass of the particles, and
      c) the mean size of the powder-coating particles is between 1 and 60 $\mu$m.

2. A powder coating as claimed in claim 1, which has a particle-size distribution such that
   a) at least 90 percent by mass of the powder-coating particles have a size of between 1 to 40 $\mu$m,
   b) the maximum size of the powder-coating particles is $\leq$60 $\mu$m for at least 99 percent by mass of the particles, and
   c) the mean size of the powder-coating particles is between 2 and 12 $\mu$m.

3. A powder coating as claimed in claim 1, which has a particles-size distribution such that
   a) at least 90 percent by mass of the powder-coating particles have a size of between 5 and 25 $\mu$m, b) the maximum size of the powder-coating particles is ≦40 μm for at least 99 percent by mass of the particles, and c) the mean size of the powder-coating particles is between 2 and 12 μm.

4. A powder coating as in claim 1 wherein the at least one thermoplastic material is selected from the group consisting of polyurethanes, polyamides, polyethylenes and polyesters.

5. A powder coating as in claim 1 having a glass transition temperature of >40° C.

6. A laminate for the production of packaging containers, comprising a substrate, having thereon a powder coating as claimed in claim 1.

7. A powder coating composition according to claim 1 wherein the coating composition comprises a thermoset resin.

8. A powder coating composition according to claim 7 wherein the thermoset resin is an epoxy resin having an equivalent weight of from 400 to 3000.

9. A powder coating as in claim 1 wherein the thermoplastic material comprises a polyurethane.

10. A powder coating as in claim 9 wherein the thermoplastic polyurethane has a Shore A hardness from 70 to 95, and a Shore D hardness from 54 to 90.

11. A powder coating as in claim 7 wherein the thermoset resin comprises at least one epoxy resin.

12. A powder coating as in claim 11 wherein the epoxy resin is present in the powder coating in an amount from 10 to 15% by weight, based on the overall weight of the powder coating.

* * * * *